United States Patent [19]

Klein et al.

[11] Patent Number: 5,480,109

[45] Date of Patent: Jan. 2, 1996

[54] SYSTEM FOR PREVENTING THE AUTOMATIC OPENING OF AN IMPROPERLY CLOSED AND LOCKED AIRCRAFT DOOR

[75] Inventors: Bernd Klein, Hamburg; Wolfgang Mueller, Beckdorf, both of Germany

[73] Assignee: Deutsche Aerospace Airbus GbmH, Hamburg, Germany

[21] Appl. No.: 210,629

[22] Filed: Mar. 18, 1994

[30] Foreign Application Priority Data

Mar. 20, 1993 [DE] Germany .................... 43 09 058.3

[51] Int. Cl.⁶ .................... B64C 1/14; E05B 45/06
[52] U.S. Cl. .................... 244/129.5; 292/DIG. 65; 340/543; 49/31
[58] Field of Search ............ 244/1 R, 118.5, 244/129.4, 129.5, 137 R; 292/DIG. 65; 340/542, 543; 49/24, 26, 28, 31

[56] References Cited

U.S. PATENT DOCUMENTS

| | | | |
|---|---|---|---|
| 3,561,160 | 2/1971 | Chan | 49/24 |
| 4,473,201 | 9/1984 | Barnes et al. | 244/129.5 |
| 4,552,326 | 11/1985 | Bakalot | 244/129.5 |
| 4,553,474 | 11/1985 | Wong et al. | 98/1.5 |
| 4,908,554 | 3/1990 | Chance | 49/28 |
| 4,915,326 | 4/1990 | Plude | 244/129.5 |
| 4,960,249 | 10/1990 | Signoret | 244/129.5 |
| 5,026,006 | 6/1991 | Tinder et al. | 244/118.5 |
| 5,163,639 | 11/1992 | Herrmann et al. | 244/129.5 |
| 5,201,830 | 4/1993 | Braswell | 244/129.5 |
| 5,379,971 | 1/1995 | Kim et al. | 244/129.5 |

FOREIGN PATENT DOCUMENTS

| | | | |
|---|---|---|---|
| 0321994 | 6/1989 | European Pat. Off. . | |
| 1133274 | 7/1962 | Germany | 49/24 |

Primary Examiner—Andres Kashnikow
Assistant Examiner—Virna Lissi Mojica
Attorney, Agent, or Firm—W. G. Fasse; W. F. Fasse

[57] ABSTRACT

A system for preventing the automatic or inadvertent opening of an aircraft door or access hatch that has not been closed and locked properly provides an increase in the overall flight safety of aircraft. The system includes a door monitoring system (1), which is connected to at least one of a cabin pressure control arrangement (4), a cabin temperature control arrangement (5), and an air tap system control arrangement (36). The door monitoring system (1) provides a signal indicating if at least one door or access hatch is not properly closed and locked. The controllers (4, 5, 36) receive the door monitor signal at respective inputs and also receive information necessary for determining the current flight configuration of the aircraft from various other aircraft systems, such as a landing gear control arrangement or an engine monitor arrangement. The controllers (4, 5, 36) evaluate the several input signals and provide output signals for controlling at least one of a cabin air venting valve, a cabin air flow control valve, and a tap air shut-off valve.

16 Claims, 3 Drawing Sheets

SYSTEM FOR PREVENTING THE AUTOMATIC OPENING OF AN IMPROPERLY CLOSED AND LOCKED AIRCRAFT DOOR

FIELD OF THE INVENTION

The invention relates to a system for preventing the automatic or unintended opening of an improperly closed and locked door or access hatch in the fuselage of an aircraft. This system efficiently contributes to an improvement of the overall flight safety of an aircraft.

BACKGROUND INFORMATION

Various solutions have been disclosed addressing the problem of aircraft doors that had accidentally not been properly closed and locked at take-off. Such doors can be unintentionally opened during flight, for example, by being blown open by a pressure differential created between the higher pressure in the cabin and the lower pressure outside the aircraft. The previously suggested solutions involve a door monitoring system that is installed in an aircraft to detect and evaluate information regarding the status of the aircraft doors. The prior art system then provides the detected and evaluated information as a visual indication on the aircraft monitoring system in the cockpit of the aircraft. In order to preclude the cockpit crew from performing incorrect actions as a result of erroneous interpretations of the cockpit indicator or as a result of an erroneous indication, additional mechanical means are provided. Specifically, mechanically operatable air vent flaps are arranged in each door of the aircraft in a manner to be operatively interconnected with the closing and locking mechanism of the door. Through the operative interconnection with the closing and locking mechanism of the door, the air vent flaps are activated only when the respective door is not properly closed and locked. In that case, the spring loaded air vent flap of the unlocked door opens when a predetermined over-pressure is achieved within the aircraft fuselage. That is to say, once a predetermined pressure is achieved within the aircraft fuselage relative to the lower pressure outside the aircraft, the air vent flap opens and allows air to escape from the aircraft to achieve a pressure compensation between the interior of the fuselage and the outside environment around the aircraft. This prevents proper pressurization of the aircraft from being achieved and therewith prevents the improperly closed and locked door from being blown out of the aircraft fuselage by the pressure differential that would exist if the aircraft were properly pressurized.

The above described prior art electronic systems involve a substantial disadvantage in that the cockpit crew is necessarily required always to take the correct and appropriate actions based on the cockpit indicators, to avoid an excess pressurization of the interior of the aircraft when a door is not properly closed and locked. Otherwise, all persons on board the aircraft would be endangered if the required pressure compensation were not initiated. In order to avoid this critical situation, and to guarantee the safety of all passengers on board the aircraft, the previous electronic indication systems must be used in conjunction with the above described mechanical air venting flaps, which are functionally installed in each door in a known manner.

Thus, the above described prior systems have a further disadvantage in that it is necessary to equip each door and access hatch in the aircraft fuselage with the above described air venting flaps. Furthermore, the operation and function of each respective air venting flap is dependent upon an additional mechanical linkage, including diverse lever linkages. Thereby, the separate operation and activation of each air venting flap in each aircraft door and access hatch increases the effort and complexity involved in operating each door and also increases the weight of each door and therewith the weight of the entire aircraft. Because each air venting flap must operate reliably, additional maintenance procedures are required to preclude, with a great degree of assurance, the danger of a blockage or operating failure of any one of the air venting flaps as a result of wear defects which are unfortunately exasperated by the additional effects of corrosion.

Conventional door monitoring systems to be employed in aircraft are disclosed, for example, in the European Patent Publication 0,321,994 and in U.S. Pat. Nos. 4,915,326 and 4,552,326. All three of the proposed solutions for the problem disclose a system in which the aircraft doors are locked as a result of an internal pressure increase in the aircraft or other parameters. According to U.S. Pat. No. 4,552,326, the door is to be locked mechanically be means of a locking bolt or pin that is operated by means of a pneumatic actuating system. The European Patent Publication 0,321,994 and U.S. Pat. No. 4,915,326 each disclose a system in which the door is locked by locking pawls that are electrically activated. Thus, in the disclosed systems, a pressure is built up in the aircraft, which realizes the locking of the aircraft doors, but simultaneously prevents opening of the doors. That is to say, the disclosed solutions do not allow the thusly operated aircraft doors to be opened in the state that is locked due to the increased pressure. The prior systems disadvantageously do not consider and provide a proper control of pressurization to allow a varied movement of the aircraft door or doors from a locked state into an opened state, nor the regulated preventing of a pressure build-up within the aircraft fuselage.

OBJECTS OF THE INVENTION

In view of the above it is the aim of the invention to achieve the following objects singly or in combination:

to provide a system of the above mentioned type that completely automatically regulates the prevention of an excess air pressure build-up within an aircraft fuselage in a take-off operating condition when one or more fuselage doors or access hatches are not properly closed and locked;

to provide such a system that absolutely prevents the automatic or inadvertent opening of even one fuselage door or fuselage access hatch due to the over-pressure of air built up within the aircraft fuselage without requiring any specific procedures to be carried out by the cockpit or cabin crew;

to provide a sufficient air venting capacity in such a system to rapidly vent excess air from inside the aircraft fuselage and thereby prevent the build-up of any interior over-pressure so as to prevent the explosive decompression or pressure compensation that would occur when a door inadvertently opens and that could lead to the total destruction of the aircraft and extreme danger to all passengers, in the worst case;

to provide such a system that operates absolutely reliably and does not require any special or particular maintenance efforts;

to provide such a system that is simpler in construction and lighter in total weight than prior attempts to solve the above mentioned problems; and to provide such a system that has relatively low demands on the costs and efforts required to produce and install the system in aircraft.

SUMMARY OF THE INVENTION

The above objects have been achieved in a system for preventing the automatic or inadvertent opening of an improperly closed and locked aircraft door according to the invention, wherein the system includes a door monitoring unit that is interconnected with certain control arrangements that each provide corresponding information or data regarding a corresponding physical condition of the interior space within the aircraft fuselage. Both the door monitoring unit and the connected control arrangements are mounted at appropriate locations within the aircraft fuselage. The door monitoring unit generally includes a door monitor control arrangement and several sensors that are installed in the fuselage doors and access hatches of the aircraft. At least one sensor is provided on each fuselage door and a plurality of sensors is grouped together to form respective sensor units. Each respective sensor unit is connected to the door monitor control arrangement, of which the functional structure includes at least one channel for receiving and evaluating the input signals and providing corresponding output signals.

In this system, the sensors or sensor units arranged in each fuselage door measure or determine, by various measurement techniques, the total status of each one of the fuselage doors. That is to say, the sensors or sensor units determine the respective open/closed and unlocked/locked status of each door. The determined status is then provided by each sensor or sensor unit to the channels of the door monitor control arrangement. All of the connections or interconnections are achieved via electrically and/or optically conducting signal conductors. The output of the door monitor control arrangement is connected to one or more of a cabin pressure control arrangement, a cabin temperature control arrangement, and an air tap system control arrangement. The air tap system control arrangement is provided for controlling the withdrawal of tap air from the jet engines and/or auxiliary jet engines of the aircraft. Further according to the invention, at least one of the cabin pressure control arrangement, the cabin temperature control arrangement, and the air tap system control arrangement is provided with a data connection or is provided with an input for receiving information to determine the aircraft flight operating condition, that is to say, the respective operating status of the aircraft.

The cabin pressure control arrangement includes a first and a second cabin pressure controller. A forward air venting valve is connected in parallel to a first output of the first cabin pressure controller and to a first output of the second cabin pressure controller. An aft air venting valve is connected in parallel to the second output of the first cabin pressure controller and to the second output of the second cabin pressure controller. A first input of each of the two cabin pressure controllers is connected by respective conductors to a first node or connection point which connects to a first signal conductor. A second input of each of the two cabin pressure controllers is connected by respective conductors to a second node or connection point which provides a connection to a second signal conductor.

These two nodes or connection points are respectively further connected to a third and a fourth node point, whereby the first and the third node points are connected by the first signal conductor or signal line while the second and fourth node points are connected by the second signal line. The third and fourth node points are respectively connected to the channel outputs of preferably two channels of the door monitor control arrangement.

The cabin temperature control arrangement includes a first and a second cabin temperature controller. A first air flow control valve is connected in parallel to a first output of each of the first and second cabin temperature controllers. A second air flow control valve is connected in parallel to a second output of each of the first and second cabin temperature controllers. The two inputs of each of the two cabin temperature controllers are respectively connected by conductors to a fifth node point arranged on the first signal conductor and a sixth node point arranged on the second signal conductor. These node points are respectively connected with the third node point arranged on the first signal conductor and with the fourth node point arranged on the second signal conductor and finally are connected to the two channel outputs of the door monitor control arrangement.

The air tap system control arrangement comprises a tap air controller of which an output is connected to a tap air shut-off valve by a respective conductor. The tap air controller has two inputs that are respectively connected by corresponding conductors to the third and fourth node points, which are arranged or provided on the first and second signal lines as described above. Through this connection, the two inputs of the tap air controller are further connected to the two channel outputs of the door monitor control arrangement.

Each of the two cabin pressure controllers and each of the two cabin temperature controllers and the tap air controller have a respective extra input that is connected to further elements of the aircraft system to receive corresponding information for determining the flight operating condition of the aircraft at any time. For example, the extra input of each of the cabin pressure controllers, cabin temperature controllers, and tap air controller can receive signals regarding the flight operating condition of the aircraft from the aircraft's landing gear control arrangement and/or the aircraft's jet engine monitor arrangement, for example.

The advantages achieved according to the invention are to be seen essentially in that the system according to the invention provides fully automatic control and operation and thereby absolutely achieves the high safety requirements of the air travel industry. The system according to the invention can be realized and installed in aircraft without any special technological efforts or costs. Because the system according to the invention has a high reliability together with a reduced weight relative to prior art systems, the invention can be broadly used in all types of aircraft.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
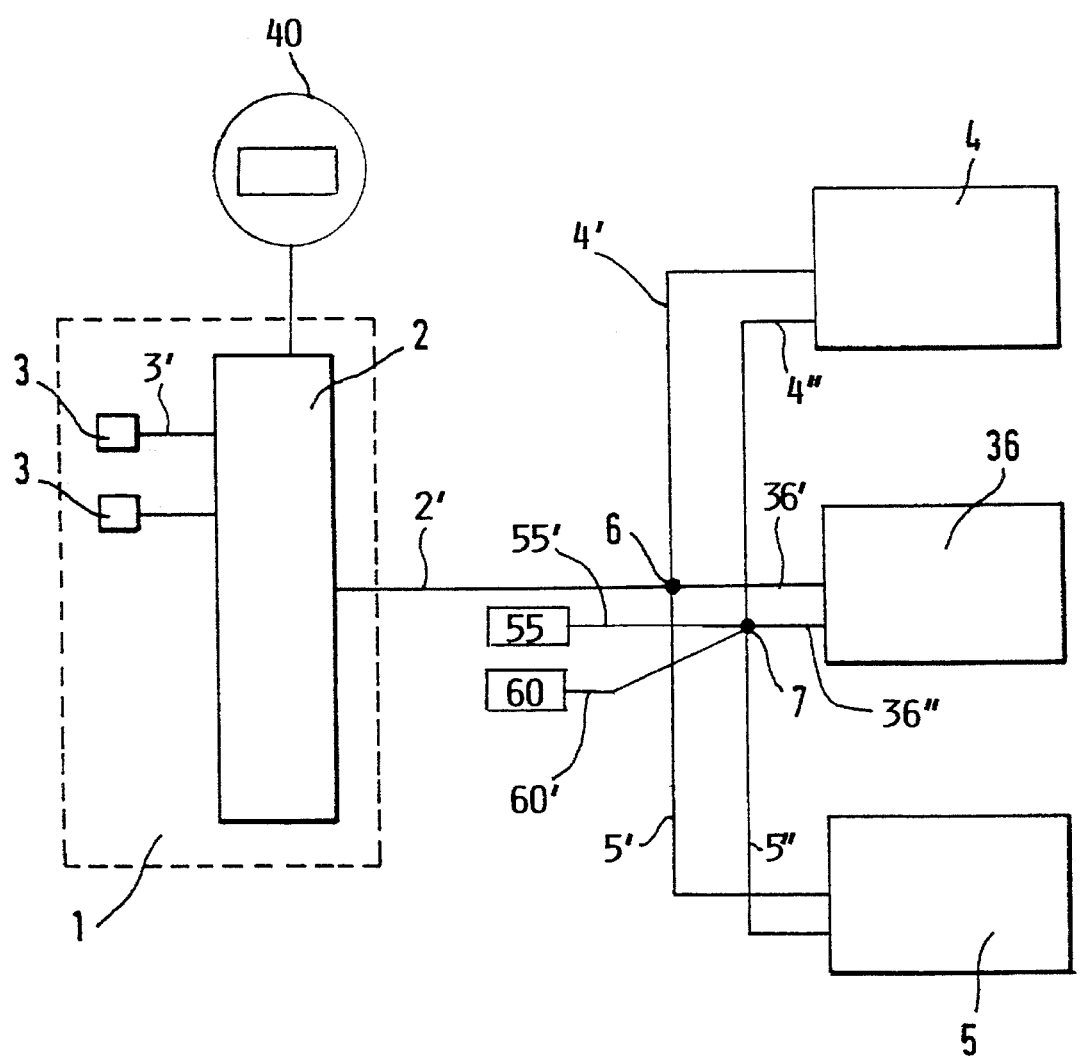
FIG. 1 is a schematic block circuit diagram of the system according to the invention.
Figure 2:
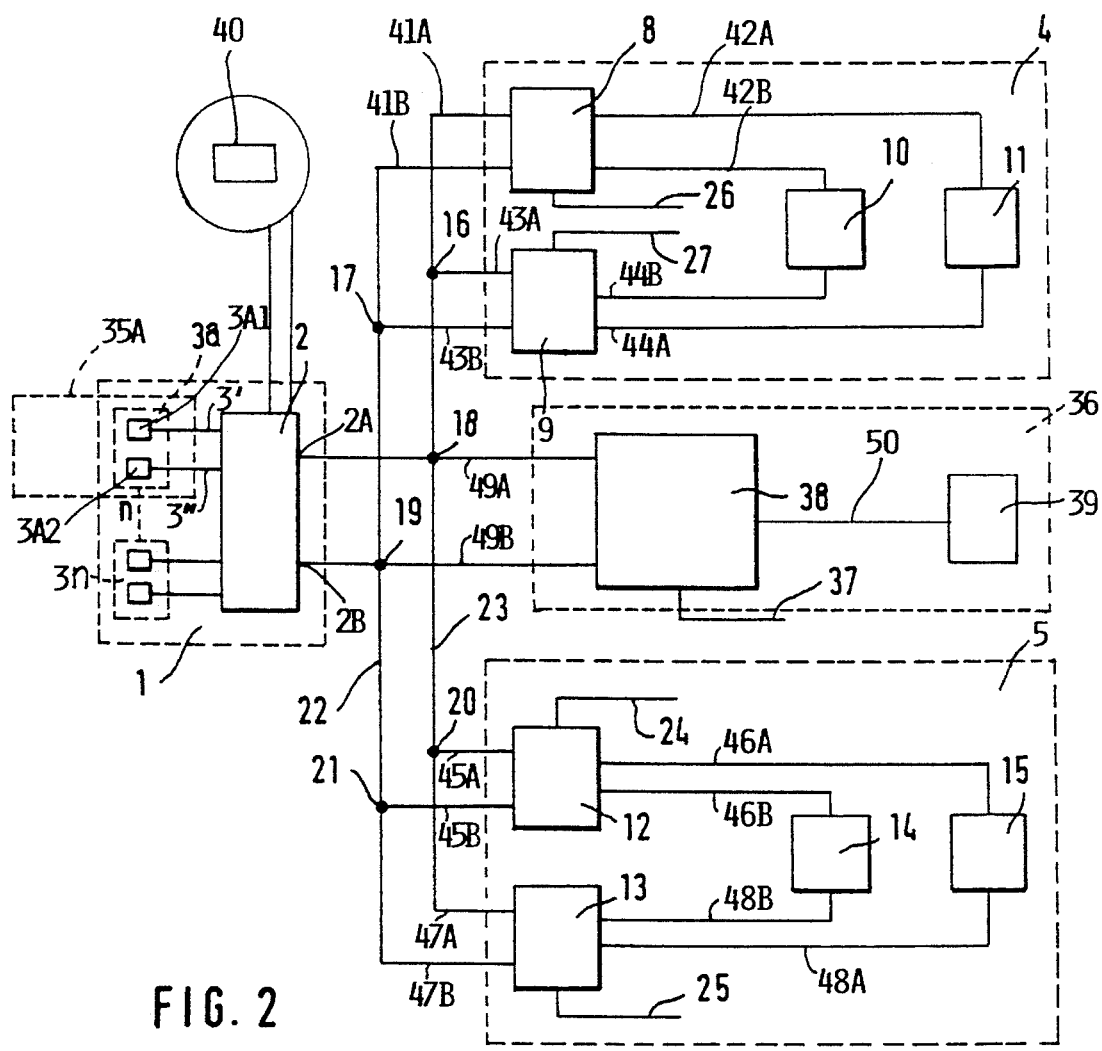
FIG. 2 is a block circuit diagram having more detail than that of FIG. 1 and showing a specific arrangement of a system according to the invention.
Figure 3:
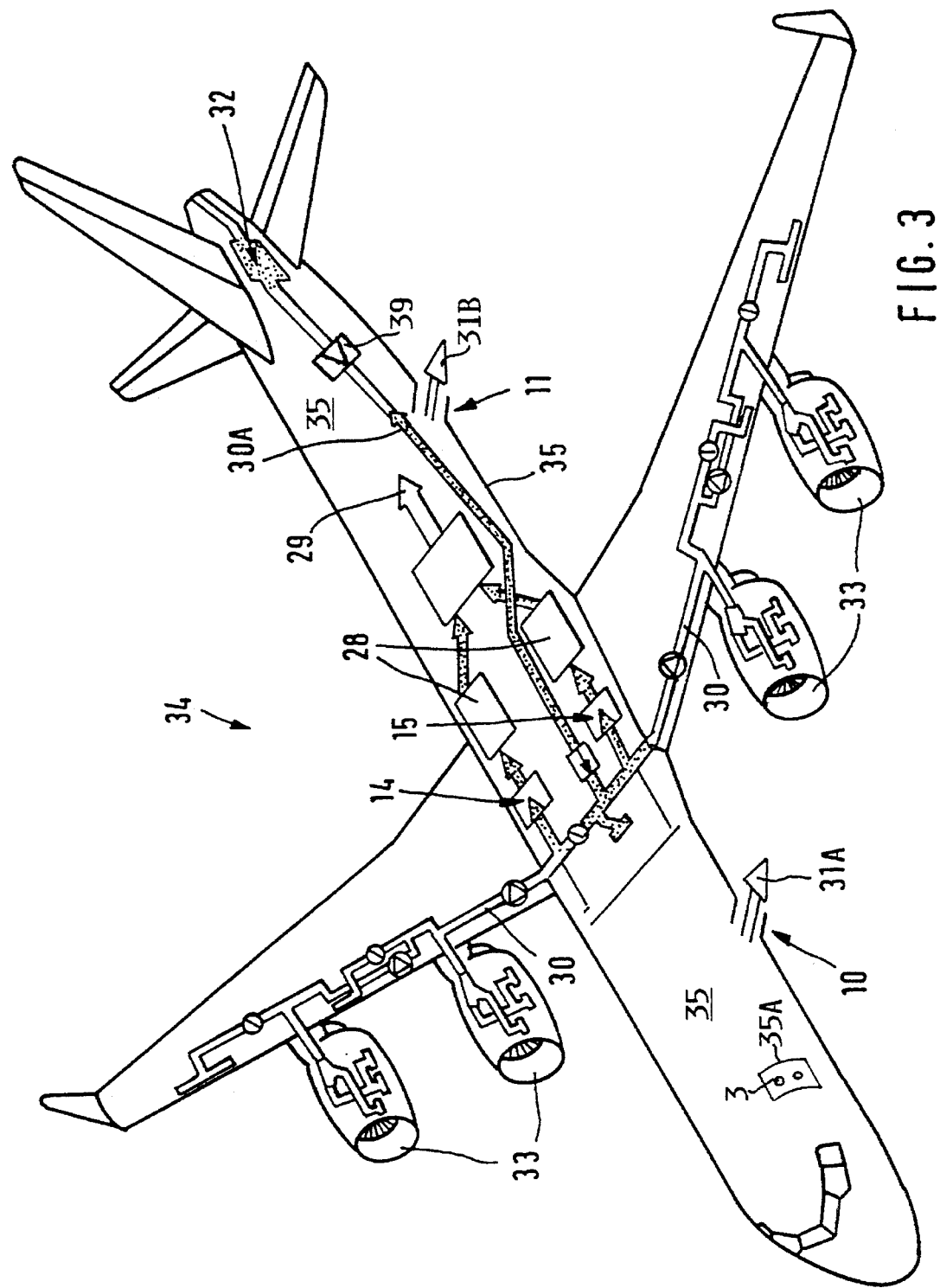
FIG. 3 is a schematic perspective view showing the arrangement of elements according to the embodiment of FIG. 2 within an aircraft fuselage.

FIG. 1 is a schematic block circuit diagram of a system for preventing the automatic or inadvertent opening of an improperly closed and locked aircraft door according to the invention. FIG. 2 shows a specific embodiment of a system according to the invention with somewhat more detail. FIG. 3 shows the separate elements of the system according to the invention as they are arranged on and within the aircraft body or fuselage 35 of an aircraft 34. As will be described below, FIG. 3 further shows other related elements for carrying out the climate control and provision of the air supply, including the pressure regulation, in the aircraft 34.

All the figures may be considered together, but referring particularly to FIG. 1, the system according to the invention includes a door monitoring system or unit 1, a cabin pressure control arrangement 4, a cabin temperature control arrangement 5 and an air tap system control arrangement 36. The control arrangements 4, 5 and 36 are connected with each other by means of respective signal conductors 4', 4", and 5', 5" and 36', 36".

The door monitoring system 1 includes a door monitor control arrangement 2 and a plurality of sensors 3 connected by signal conductors 3' to the door monitor control arrangement 2. Respective pairs of the sensors 3 together form sensor units 3a to 3n as shown particularly in FIG. 2. The sensors 3, or rather the sensor units 3a to 3n are installed in the several fuselage doors 35A of the aircraft 34 as indicated schematically in FIG. 2 and shown in FIG. 3. At each door or access hatch 35A, the respective sensor 3 can use any measuring or sensing technology to determine the total status of the respective fuselage door 35A and provide respective signals corresponding to the determined total status to the door monitor control arrangement 2 via the conductors 3', 3".

Preferably two sensors 3a1 and 3a2 are combined into a sensor unit 3a, which is installed into each fuselage door 35A. For an aircraft having a total of n doors and access hatches 35A, the same number n of sensor units 3a to 3n will be provided. The measuring or sensing elements of each sensor unit 3a to 3n practically arranged in each fuselage door 35A, after being polled, transmit their currently determined door status values to the door monitor control arrangement 2. The door monitor control arrangement 2 preferably has two evaluation channels that receive and compare the measurement results signalled by the sensors installed in the fuselage doors and access hatches 35A numbering from 1 up to n.

If the comparison of the input signals in the two channels of the door monitor control arrangement 2 determines or detects a non-equivalent signal being provided by the two sensors or two conductors of a sensor unit, then the door monitor control arrangement 2 automatically trips into a safety condition because it is not clear which of the two received status signals is the correct signal. Similarly, if the same status is not reported by all fuselage door sensor units, then the door monitor control arrangement 2 will also automatically trip into a safety condition because not all the doors have the same status. Practically, this safety condition that results when the measured signal comparison determines that the measured signals are not equivalent, effectively acts as if at least one fuselage door and/or fuselage access hatch is open or not properly closed and locked. Once all of the n fuselage access hatches and doors 35A are properly closed and locked, then this resultant total status of all of the doors is correspondingly evaluated and registered within the two channels of the door monitor control arrangement 2 and finally produced as a total status signal at the two outputs 2A and 2B of the arrangement 2.

The total status of the fuselage doors 35A, which is produced at the output of the door monitor control arrangement 2, is indicated on the one hand in the cockpit on a door status indicator 40 that forms part of the total aircraft monitor system. On the other hand, the total status signal provided at the output of the door monitor door arrangement 2 is primarily provided for further processing in the cabin pressure control arrangement 4, the cabin temperature control arrangement 5 and the air tap system control arrangement 36. This is achieved in that the two channel outputs of the door monitor control arrangement 2 are connected via a conductor lane 2' to a connection or node point 6, which is further connected to the input of the cabin pressure control arrangement 4 via a conductor line 4' and to the input of the cabin temperature control arrangement 5 via a conductor line 5' and to the input of the air tap system control arrangement 36 via a conductor line 36'. Furthermore, the control arrangements 4, 5 and 36 each have an extra input to which is connected an electrical and/or optical signal conductor line 4", 5" and 36" respectively. The conductor lines 4", 5" and 36" are each connected to a node point 7, which is further connected by respective conductor lines 55' and 60' to a landing gear control arrangement 55 and a jet engine monitoring arrangement 60. Thus, data or information necessary for determining the respective current flight operating condition of the aircraft is provided by the aircraft's landing gear control arrangement 55 and jet engine monitor arrangement 60 to the control arrangements 4, 5 and 36.

Referring now particularly to FIG. 2, a specific embodiment and more detailed presentation of the arrangement already shown in the general block circuit diagram of FIG. 1 will now be described. The block circuit diagram of FIG. 2 shows the particular construction of the cabin pressure control arrangement 4, the cabin temperature control arrangement 5 and the air tap system control arrangement 36. As shown, the cabin pressure control arrangement 4 includes two cabin pressure controllers 8 and 9. The cabin pressure controllers 8 and 9 each have two outputs that are each respectively connected to two exhaust or air venting valves 10 and 11. The exhaust or venting valves 10 and 11 are, for example, electronically controllable for activating the opening and closing of the valves 10 and 11, whereby the electrical connections for controlling and regulating the valves are respectively connected in parallel to one output of the two cabin pressure controllers 8 and 9. That is to say, the forward air venting valve 10 is connected by a corresponding conductor to a first output 42B of the first cabin pressure controller 8 and also to the first output 44B of the second cabin pressure controller 9. On the other hand, the aft air venting valve 11 is connected by respective corresponding conductors to a second output 42A of the cabin pressure regulator 8 and a second output 44A of the cabin pressure regulator 9.

On the input side of the cabin pressure regulators 8 and 9, two first inputs 41A and 43A, respectively, are connected to a first node point 16 and two second inputs 41B and 43B are connected to a second node point 17 by means of corresponding respective signal conductors. The two node points 16 and 17 are connected to third and fourth node points 18 and 19 respectively, whereby a signal line 23 connects the first node point 16 and the third node point 18 and a second signal line 22 connects the second node point 17 and the fourth node point 19.

The cabin temperature control arrangement 5 includes two cabin temperature controllers 12 and 13. Each of the cabin temperature controllers 12 and 13 has two outputs, which are respectively connected to two air flow control valves 14 and 15. The air flow control valves 14 and 15 are electronically controllable for activating the opening and closing of each of the valves, whereby the electrical connections for controlling the respective valves are each connected respectively in parallel to one output of the two cabin temperature controllers 12 and 13. That is to say, the first air flow control valve 14 is connected on the one hand to a first output 46B of the first cabin temperature controller 12 and on the other hand to the first output 48B of the second cabin temperature controller 13 via respective corresponding conductors. The second air flow control valve 15 is connected by corresponding conductors on the one hand to the second output 46A of the cabin temperature controller 12 and on the other hand to the second output 48A of the cabin temperature controller 13.

The two respective first inputs 45A and 47A of the two cabin temperature controllers 12 and 13 are connected by respective corresponding conductors to a fifth node point 20 and the two respective second inputs 45B and 47B of the cabin temperature controllers 12 and 13 are connected by respective corresponding conductors to a sixth node point 21. These two node points 20 and 21 are connected to the third and fourth node points 18 and 19, whereby the signal line 23 connects the fifth node point 20 and the third node point 18 while the second signal line 22 connects the sixth node point 21 and the fourth node point 19.

The air tap system control arrangement 36 includes a tap air controller 38 that has two respective inputs 49A and 49B. In a manner similar to that described above, the two inputs 49A and 49B are respectively connected by corresponding conductor lines to the third and fourth node points 18 and 19, which in turn are connected by signal conductors to the two channel outputs 2A and 2B of the door monitor control arrangement 2. The tap air controller 38 has one output 50, which is connected by a corresponding conductor to a tap air shut-off valve 39, which is, for example, electronically controllable in order to activate its opening or closing.

As mentioned generally with reference to FIG. 1, an extra input is provided for each of the cabin pressure regulators 8 and 9, each of the cabin temperature regulators 12 and 13, as well as the tap air controller 38. Respective electrical and/or optical signal conductor lines 26, 27, 24, 25 and 37 are attached to the respective extra inputs on the one hand and to the aircraft's landing gear control arrangement 55 and the engine monitoring arrangement 60 on the other hand. Thereby, the conductors 26, 27, 24, 25 and 37 provide information or data necessary for determining the respective current flight operating condition or status of the aircraft to the controllers 8, 9, 12, 13 and 38. By comparing FIGS. 1 and 2, it is apparent that the conductor shown generally as 4' in FIG. 1 corresponds to conductors 41A, 41B, 43A and 43B in FIG. 2. Similarly, conductor 4" corresponds to conductors 26 and 27. Conductor 36' corresponds to conductors 49A and 49B. Conductor 36" corresponds to conductor 37. Conductor 5' corresponds to conductors 45A, 45B, 47A and 47B. Conductor 5" corresponds to conductors 24 and 25.

As described above with reference to FIG. 1, but shown more particularly in FIG. 2, the data provided by the landing gear control arrangement 55 and engine monitoring arrangement 60 of the aircraft are conducted by signal lines 26 and 27 to the cabin pressure regulators 8 and 9, by the signal lines 24 and 25 to the cabin temperature controllers 12 and 13 and by the signal line 37 to the air tap system controller 36 in order for those controllers to determine the respective current flight operating status. Moreover, as has been described with reference to FIG. 1, the total or overall status of the fuselage door units that is provided at the outputs 2A, 2B of the two channels of the door monitor control arrangement 2 is provided on the one hand to a door monitor indicator 40 installed in the cockpit as part of the aircraft monitoring system. On the other hand, the total status signal is primarily provided to be further processed in the cabin pressure control arrangement 4, the cabin temperature control arrangement 5, and the air tap system control arrangement 36. That is achieved, as shown in FIG. 2, via conductors connected to the two outputs 2A and 2B from the two channels of the door monitor control arrangement 2, whereby the output of a first channel 2A is connected to the third node point 18 and the second output 2B of the second channel is connected to the fourth node point 19 via respective corresponding signal lines. Corresponding conductors as described above connect these node points 18 and 19 to the inputs of the cabin pressure control arrangement 4, the cabin temperature control arrangement 5 and the air tap system control arrangement 36.

It should be noted that the system according to the invention can operate as an electrical system having electrical conductors interconnecting the various components, which are electrical evaluating or operating components, whereby electrical signals are conducted along the conductors. On the other hand, all of the above described interconnections can be provided by optical conductors, such as optical fibers, which carry the respective signals in the form of optical signals, which may even be processed through optical circuitry within the respective components of this system. The signal conversion of the overall or total door status described above is achieved by means of the door monitor control arrangement 2, which evaluates the input signals in a channel-wise manner and provides respective channel-wise outputs in the form of electrical and/or optical signals, which are conducted or transmitted over all the conductor paths. The data signals providing information for determining the aircraft's operating status can also be provided by pollable electrical and/or optical signals.

The cabin pressure controllers 8 and 9 and the cabin temperature controllers 12 and 13 as well as the tap air controller 38 process the signals provided by the door monitor control arrangement 2 at the outputs 2A and 2B of the two channels of the door monitor control arrangement 2. These signals, as already mentioned, represent the overall or total status of the fuselage doors 35A and/or fuselage access hatches or door units. Furthermore the cabin pressure controllers 8 and 9, the cabin temperature controllers 12 and 13, and the tap air controller 38 simultaneously process the signals for determining the aircraft's operating status, which are provided by the aircraft's landing gear control 55 and/or engine monitor arrangement 60. These signals indicate the respective current operating status of the aircraft 34, for example, insofar as they indicate whether the jet engines 33 of the aircraft 34 are shut down or idling or in an operating condition, that is to say, in what position the engine thrust control lever is placed, and whether the aircraft 34 is on the ground or in the air, for example, by indicating whether the aircraft is in a take-off, landing, taxiing, or flight configuration.

If the aircraft 34 is in a flying operating condition, that is to say, for example, at least one engine 33 is in an operating condition or configuration, then the input signals of the door monitor control arrangement 2 are transmitted on to the cabin pressure controllers 8 and 9, the cabin temperature controllers 12 and 13, and the tap air controller 38 where the signals are further electronically evaluated. In the event that the aircraft is in a flying operating configuration as described, and the door monitor control arrangement 2 determines that a door 35A is not properly closed and locked, then the cabin pressure controllers 8 and 9 provide electrical and/or optical control signals at their respective outputs for achieving a position control of the two air venting valves 10 and 11. The control signals output by the cabin pressure controllers 8 and 9 effectuate the complete opening of the exhaust or venting valves 10 and 11 to provide the largest possible exhaust or venting flow cross-section.

Similarly, in such a case when the aircraft is in a flying operating configuration, but one or more doors are not properly closed and locked, then the cabin temperature control arrangement and the air tap control arrangement 36 provide the respective appropriate signals for controlling the air flow control valves 14 and 15 and the tap air shut-off valve 39 to restrict or shut-off the pressurizing air flow to the aircraft cabin while maintaining appropriate climate control of the cabin.

That is to say, the cabin temperature controllers 12 and 13 operate in such a manner that the channel output signals provided by the door monitor control arrangement 2 are received at the inputs of the cabin temperature controllers 12 and 13 and intermixed with the signals for determining the aircraft operating condition or configuration received at the extra inputs 24 and 25. The signals are then evaluated and processed to provide an appropriate output control signal for closing the air flow control valves 14 and 15 in order to interrupt the fresh air supply into the aircraft fuselage 35. Similarly, the tap air controller 38 operates according to a method wherein the channel output signals provided by the door monitor control arrangement 2 are received at the inputs of the tap air controller 38 and mixed and processed together with the signals for determining the aircraft operating configuration in order to produce a control signal for closing the tap air shut-off valve 39, whereby the fresh air delivery into the aircraft fuselage 35 is interrupted.

FIG. 3 schematically shows the arrangement of various components of the system according to the invention in and on an aircraft fuselage 35 of the aircraft 34. For example, the air flow valves 14 and 15, which are controlled by the cabin temperature control arrangement 5 as described above, are arranged in fresh air conduits or ducts 30. There the valves 14 and 15 control the delivery of fresh air into the cabin air supply preparation plant or climate control plant 28 to provide a cabin air supply flow 29. The forward air venting valve 10 and the aft air venting valve 11, which are controlled by the cabin pressure controllers 8 and 9, are arranged through the fuselage wall 35 as indicated schematically in the figure. The tap air shut-off valve 39, which is controlled by the tap air controller 38 as described above, is arranged in a tap air duct 30A coming from an auxiliary jet engine 32. The other components that are indicated schematically in the figure are various air flow conduits and other elements necessary for the air supply and climate control as well as the pressure regulation within the aircraft fuselage 35. These components are shown in a schematic manner in order to facilitate an understanding of the function of the components of the system according to the invention.

Although the invention has been described with reference to specific example embodiments, it will be appreciated that it is intended to cover all modifications and equivalents within the scope of the appended claims.

What is claimed is:

1. A system for preventing the automatic opening of an improperly closed and locked aircraft door for use in an aircraft (34) having a fuselage (35), at least one door (35A) through the fuselage, an air supply and exhaust system and at least one device providing data indicative of the operating status of the aircraft, the system comprising a door monitoring unit (1) that comprises a door monitor control arrangement (2) having at least one data evaluation channel and a plurality of sensors (3) grouped together to form a smaller plurality of sensor units (3n), wherein at least one sensor (3) is installed in the at least one door of the aircraft to detect a closing and locking status of the door, respective conductors connecting each of said sensors (3) to respective inputs of said door monitor control arrangement (2) to provide a signal representing said closing and locking status from each said sensor (3) to said at least one data evaluation channel, at least one air system control arrangement (4, 5, 36) arranged to control the air supply and exhaust system, respective conductors connecting respective outputs of said door monitor control arrangement (2) to inputs of said air system control arrangement (4, 5, 36), and respective conductors connecting the device providing data indicative of the operating status of the aircraft to at least one respective extra input of said at least one air system control arrangement (4, 5, 36).

2. The system of claim 1, wherein said at least one air system control arrangement comprises an arrangement selected from the group consisting of a cabin pressure control arrangement (4), a cabin temperature control arrangement (5), and an air tap system control arrangement (36).

3. The system of claim 2, wherein said at least one air system control arrangement comprises each of said cabin pressure control arrangement, said cabin temperature control arrangement and said air tap system control arrangement.

4. The system of claim 1, wherein said conductors comprise electrical conductors.

5. The system of claim 1, wherein said conductors comprise optical conductors.

6. The system of claim 1, wherein respective pairs of said sensors (3) form respective ones of said sensor units (3n).

7. The system of claim 1, wherein said door monitor control arrangement (2) has two data evaluation channels.

8. The system of claim 1, wherein at least one of said sensors is installed in each of the doors of the aircraft.

9. The system of claim 2, wherein said conductors connecting respective outputs of said door monitor control arrangement (2) to inputs of said air system control arrangement (4, 5, 36) comprise a first signal conductor line (23) connected at a third node point (18) to a first channel output (2A) of said door monitor control arrangement (2) and a second signal conductor line (22) connected at a fourth node point (19) to a second channel output (2B) of said door monitor control arrangement (2).

10. The system of claim 9, wherein said at least one air system control arrangement comprises said cabin pressure control arrangement (4), which comprises a first cabin pressure controller (8), a second cabin pressure controller (9), a forward air venting valve (10), and an aft air venting valve (11), wherein each of said pressure controllers (8, 9) has a first input connected at a first node point (16) to said first signal conductor line (23) and a second input connected at a second node point (17) to said second signal conductor line (22), and wherein each of said pressure controllers (8, 9) has a first output connected to said forward air venting valve (10) and a second output connected to said aft air venting valve (11).

11. The system of claim 10, wherein said at least one extra input of said at least one air system control arrangement comprises a respective extra input (26, 27) provided on each of said pressure controllers (8, 9).

12. The system of claim 9, wherein said at least one air system control arrangement comprises said cabin temperature control arrangement (5), which comprises a first cabin temperature controller (12), a second cabin temperature controller (13), a first air flow control valve (14), and a second air flow control valve (15), wherein each of said temperature controllers (12, 13) has a first input connected at a fifth node point (20) to said first signal conductor line (23) and a second input connected at a sixth node point (21) to said second signal conductor line (22), and wherein each of said temperature controllers (12, 13) has a first output connected to said first air flow control valve (14) and a second output connected to said second air flow control valve (15).

13. The system of claim 12, wherein said at least one extra input of said at least one air system control arrangement comprises a respective extra input (24, 25) provided on each of said temperature controllers (12, 13).

14. The system of claim 9, wherein said at least one air system control arrangement comprises said air tap system control arrangement (36), which has a first input connected to said third node point (18) of said first signal conductor line (23) and a second input connected to said fourth node point (19) of said second signal conductor line (22).

15. The system of claim 14, wherein said air tap system control arrangement (36) comprises a tap air controller (38) and a tap air shut-off valve (39) connected to an output of said tap air controller (38), wherein said first and second inputs of said air tap system control arrangement (36) are first and second inputs of said tap air controller (38), and wherein said at least one extra input of said at least one air system control arrangement comprises an extra input (37) provided on said tap air controller (38).

16. The system of claim 1, further comprising a door status indicator (40) installed in a cockpit of the aircraft and connected to said door monitor control arrangement (2).

\* \* \* \* \*